United States Patent Office 2,791,237
Patented May 7, 1957

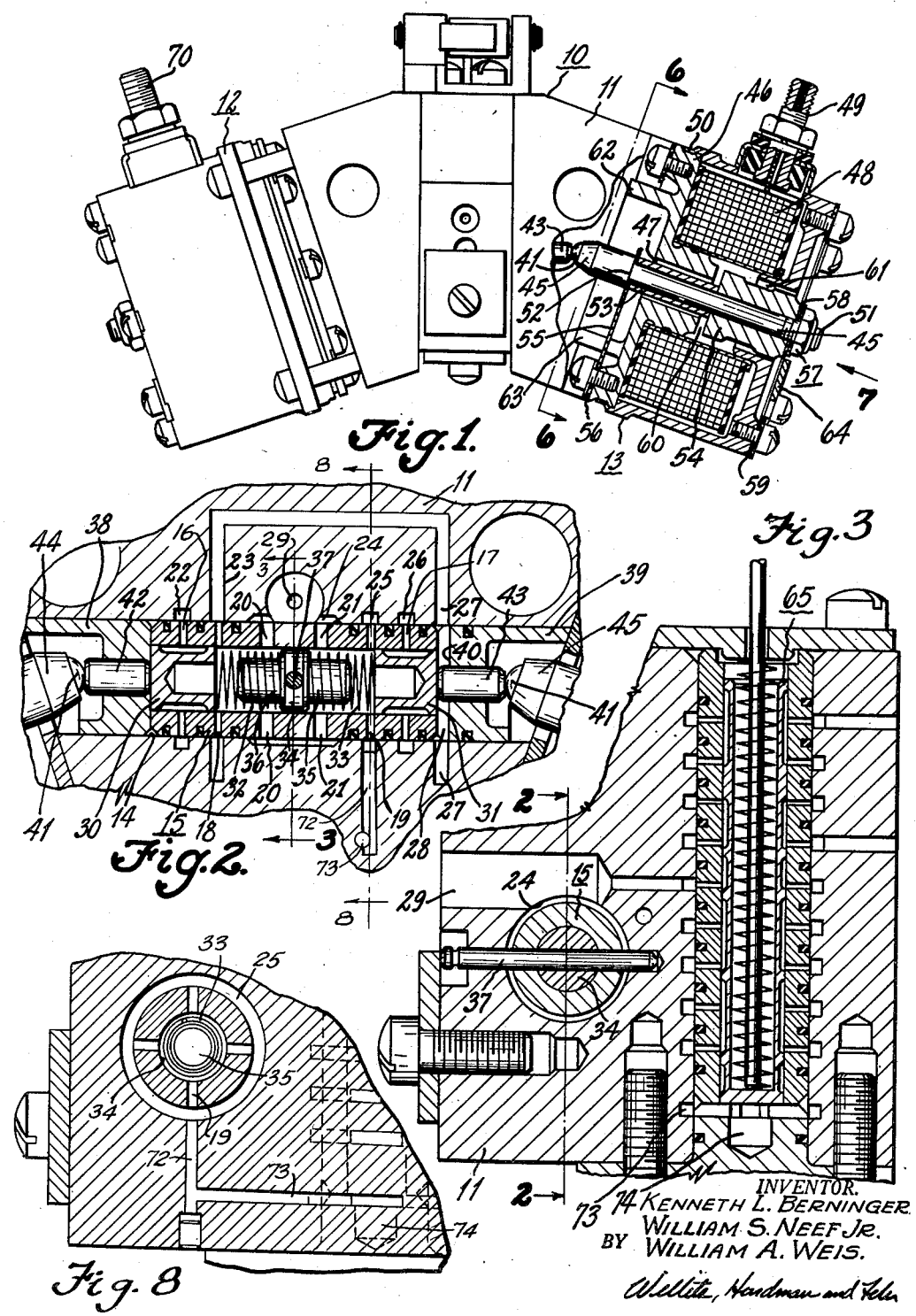

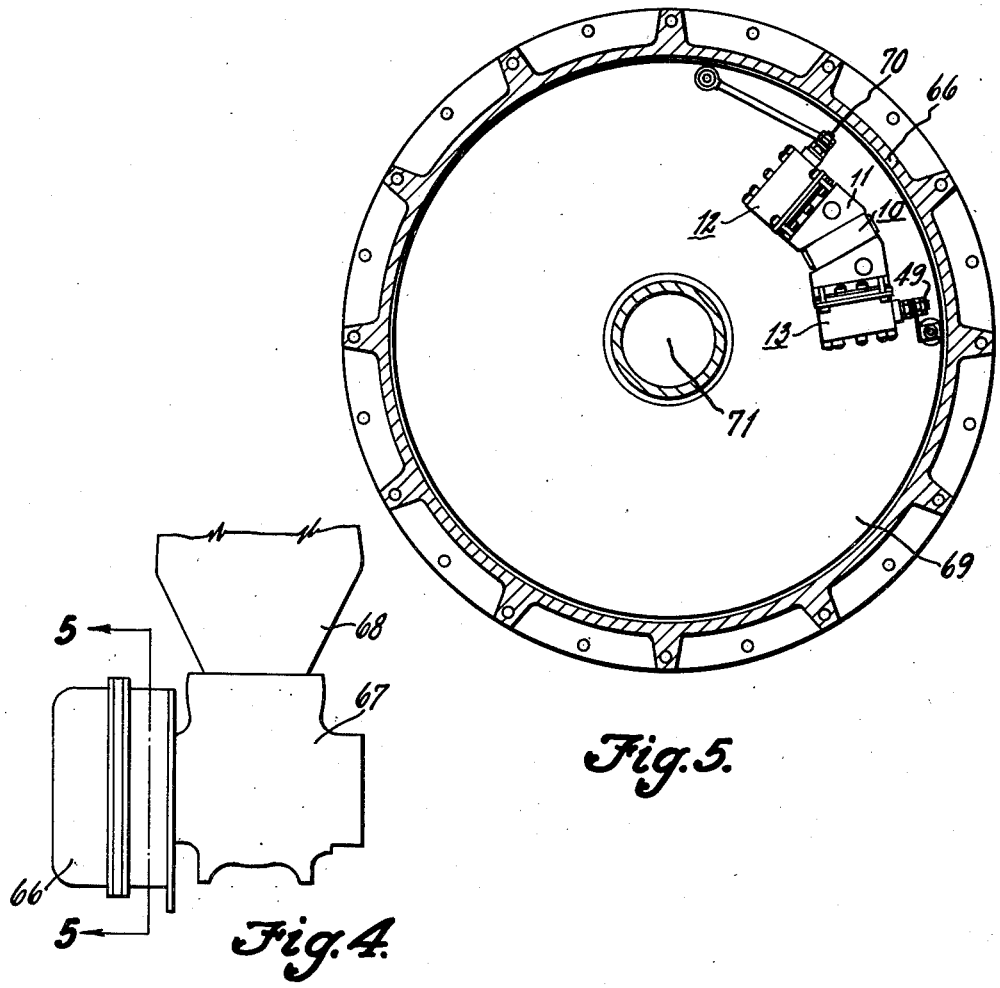

2,791,237
VALVE ASSEMBLY

Kenneth L. Berninger, William S. Neef, Jr., and William A. Weis, Dayton, Ohio, assignors to General Motors Corporation, Detroit, Mich., a corporation of Delaware Application September 26, 1952, Serial No. 311,767

11 Claims. (Cl. 137—623)

The present invention pertains to valves, and more particularly to valves designed and constructed for operation in rotating structure.

Valve assemblies, suitable for controlling flow in fluid circuits wherein the valve assemblies are rigidly mounted and retained in a relatively fixed position are wholly inadequate for use in fluid circuits wherein the valve assemblies are disposed in a rotating structure. Valve assemblies of the latter character require consideration of aspects non-existent in other adaptations. Accordingly, one of our objects is to provide a valve assembly which may be used in rotating structures.

The aforementioned and other objects are accomplished in the present invention by providing a valve assembly with the component parts thereof so constructed and arranged that the centrifugal force existent in a rotating structure will not interfere with proper valve operation. To achieve the desired results, the valve structure embraces a housing having angularly related portions within which movable elements are disposed in such a manner that when the valve assembly is mounted in a rotatable structure, centrifugal force will act at substantially right angles to the direction in movement of the elements. The housing includes a valve body having a pair of solenoid enclosures rigidly attached thereto at its extremities, the valve body having a through bore within which a porting sleeve is supported. A spool valve assembly is supported concentrically within the porting sleeve for lineal movement relative thereto under the impetus of solenoid actuated plungers or fluid under pressure.

The spool valve assembly comprises a pair of spool valves normally maintained in a port closing position by resilient means. A pair of solenoid operated plungers are constrained to move the spool valves to a port opening position and in addition, servo actuated means are provided for moving one of the spool valves to a port open position independent of its associated plunger. Each solenoid actuated plunger carries an armature cooperable with a field magnet of a solenoid through an annular air gap. The plunger has a floating support within the solenoid enclosure, which support is constituted by a spring assembly. The spring assembly includes two annular springs, each having a radially inwardly extending portion attached to the plunger. Stop means are provided for limiting plunger movement as well as movement of the spool valves.

Further objects and advantages of the present invention will be apparent from the following description, reference being had to the accompanying drawings, wherein a preferred embodiment of the present invention is clearly shown.

In the drawings:

Fig. 1 is a view partly in longitudinal section and partly in elevation of the invention disclosed herein.

Fig. 2 is an enlarged fragmentary sectional view taken along line 2—2 of Fig. 3.

Fig. 3 is an enlarged fragmentary sectional view taken along line 3—3 of Fig. 2.

Fig. 4 is a fragmentary view in elevation of a propeller unit with which the valve assembly may be associated.

Fig. 5 is an enlarged sectional view taken along line 5—5 of Fig. 4.

Fig. 6 is a sectional view taken along line 6—6 of Fig. 1.

Fig. 7 is a view taken in the direction of arrow 7 of Fig. 1.

Figure 8 is a fragmentary sectional view taken along line 8—8 of Figure 2.

Although the present valve assembly is exemplified in conjunction with a variable pitch propeller, it is to be understood that this is only by way of example as the valve assembly may be used in other adaptations. Referring to Fig. 1, a valve housing 10 include a valve body 11 having attached thereto at opposite extremities magnet assembly enclosures 12 and 13. As is apparent from an inspection of the drawings, the valve housing 10 is constructed to have angularly related portions for a purpose which will later be apparent.

Referring particularly to Fig. 2, valve body 11 has a through bore 14 within which a porting sleeve 15 is disposed. The porting sleeve 15 has two sets of circumferentially spaced supply ports 16 and 17 adjacent opposite ends thereof; two sets of circumferentially spaced control ports 18 and 19 spaced inwardly of the supply ports 16 and 17 respectively; and two sets of circumferentially spaced drain ports 20 and 21 likewise spaced inwardly of the control ports 18 and 19. The valve body 11 has a plurality of annular grooves 22, 23, 24, 25, 26 and 27. Each of the annular grooves 22 to 26, cooperate with one of the sets of ports heretofore mentioned, and the annular groove 27 communicates with a servo chamber 28 disposed at one end of the porting sleeve 15. The annular groove 24 connects with a passage 29 which constitutes the drain port of the valve assembly. In a like manner each of the annular grooves 22, 23, 25, 26 and 27 connect with passages, not shown, within the valve body 11 through which fluid flows either to or from the porting sleeve 15.

Disposed within the bore of the porting sleeve 15 is a spool valve assembly comprising a pair of spool valve elements 30 and 31 normally urged apart by a pair of springs 32 and 33 supported by an abutment member 34 having a pair of oppositely extending spring guides 35 and 36. The abutment member 34 is retained in a central position within the porting sleeve 15 by means of a transversely extending pin 37, which passes through the abutment member 34, the porting sleeve 15, and is seated within recesses of the valve body 11. Thus, the pin 37 retains both the porting sleeve and the abutment member 34 within the through bore 14 of the valve body.

Each spool valve element is provided with a pair of spaced lands separated by an annular groove which communicates with the supply port of the respective spool valve 30 or 31. Rigidly supported within opposite ends of the through bore 14 are a pair of abutment members 38 and 39, each of which has a central opening comprising portions of different diameter extending therethrough. The abutment members 38 and 39 are retained within the through bore 14 by any suitable means, not shown. One end of the abutment member 38 is disposed in contiguous relation with respect to one end of the porting sleeve 15 and as a consequence thereof, this end of abutment member 38 constitutes a mechanical stop limiting the movement of spool valve 30 in one direction. The end surface 40 of the abutment member 39 is spaced from the other end of the porting sleeve 15 whereby the servo chamber 28 is formed. Through the smaller diameter portions of the central openings in each of the abutment members 38 and 39, slidable pins 42 and 43 are disposed.

Within the larger diameter portions of the central openings in the abutment members 38 and 39 are disposed the ends of the plunger assemblies 44 and 45. Each plunger assembly carries a spherical contact member 41 adapted for engagement with one end of the sliding pins 42 and 43. Normally, the slidable pins 42 and 43 are confined respectively between the end surfaces of their associated spool valves and the spherical portions of their associated plungers. Thus, the pin 43 constitutes a stop defining the limit of movement of spool valve 31 under the impetus of spring 33.

As the magnet assemblies with which the plungers 44 and 45 are associated with are of identical construction, a detailed description of one is deemed to be sufficient. With particular reference to Figs. 1, 6 and 7, the magnet assembly disposed within enclosure 13 includes a field magnet 46 having a central opening 47 through which the plunger 45 extends. Associated with a portion of the field magnet 46 is a solenoid winding 48 having electrical connection to a terminal 49. One end of the solenoid enclosure 13 is peened at 50 over the end of the field magnet 46. The magnet assembly is attached to the valve body 11 in any suitable manner such as by means of threaded devices. The plunger 45 has a threaded end portion 51. Between the threaded end portion 51 and a shoulder 52 formed on the plunger 45 are disposed a spacer sleeve 53 and an armature 54. Between one end of the sleeve 53 and the shoulder 52, a radially inward extending leaf portion 55 of a spring diaphragm 56 is interposed. Likewise, between one end of the armature 54 and a lock washer and nut assembly 57 engaging the threaded portion 51 of the plunger is a radially inward extending leaf portion 58 of a spring diaphragm 59.

By reason of the fact that the valve assembly of the instant invention is adapted for utilization in rotating structure, the plunger assembly including the movable armature 54 which cooperates with the field magnet 46 through an annular air gap 60 must be supported so that the effects of centrifugal force thereon will not have any detrimental effect upon desired plunger movement. Accordingly, the plunger assembly is floatingly mounted within the magnet 46 and the enclosure 13. With particular reference to Figs. 6 and 7, it is apparent that the spring diaphragms 56 and 59 resiliently support the plunger assembly through their radially inward extending portions 55 and 58. The portions 55 and 58 maintain the plunger assembly in substantially concentric relationship with respect to the opening 47 in the field magnet 46 and the opening 61 in the enclosure 13. Each of the portions 55 and 58 is provided with an opening through which a portion of the plunger 45 extends, which openings are coaxial with the openings in the field magnet and the enclosure.

The annular portions of the spring diaphragms 56 and 59 are attached respectively with the field magnet 46 and the enclosure 13 by means of suitable screw devices. The annular extending portion 62 of the field magnet 46 has a longitudinally extending slot 63 therein through which the radially extending portion 55 of the spring diaphragm 56 extends. Movement of the plunger assembly 45 to the left, as viewed in Fig. 1, is limited by engagement between the ends of the armature 54 and the field magnet 46. The plunger assembly in so moving stretches the portions 55 and 58 of the spring diaphragms, and upon deenergization of the solenoid winding 48, these portions will return the plunger assembly to the position it is shown in Fig. 1. Movement of the plunger assembly after deenergization of the solenoid winding 48 is limited by an arcuate diaphragm stop member 64, which is rigidly attached to the enclosure 13 by means of screw devices and presents an intermediate portion for engagement with the portion 58 of the spring diaphragm 59. The extent of the air gap 60 is determined by the relative lengths of the spacing sleeve 53 and the armature 54, and as the longitudinal extent of the air gap determines the amount of plunger movement, the respective lengths of the sleeve and armature are initially determined to assure that movement of the plunger upon energization of the solenoid winding 48 will effect the requisite movement of the spool valve 31 along the porting sleeve 15 to connect ports 17 with ports 19.

The valve assembly heretofore described may be used in a fluid circuit of the type disclosed in copending application, Serial No. 284,169, filed April 24, 1952, now Patent No. 2,754,922, issued July 17, 1956, in the name of Kenneth L. Berninger, et al. When the valve assembly is used in this capacity, the function thereof is to control flow of fluid to a servo actuated selector valve, designated generally as 65 in Fig. 3. The particular construction of the selector valve 65 forms no part of the present invention although it is disposed within the valve body 11 and forms an integral part thereof. When the valve assembly is used in conjunction with a variable pitch propeller, it is mounted within a rotating regulator structure 66, shown in Fig. 4. The regulator structure is rigidly attached to a propeller hub 67 and rotates therewith. The propeller hub is provided with a plurality of sockets within which propeller blades such as the one designated by 68 are journaled for rotation about their longitudinal axes. The flow of pressure fluid to the motor means for effecting movement of the propeller blades about their longitudinal axes is controlled by a fluid circuit disposed within the regulator 66, which the valve assembly of the present invention may be a component of.

Referring more particularly to Fig. 5, the housing 10 of the valve assembly of the present invention is rigidly mounted to a partition 69 formed within the regulator structure 66. Electrical terminals 49 and 70 of the valve assembly are connected by electrical leads through suitable switch mechanism, not shown, to a source of electrical power, likewise not shown. The valve housing 10 is constructed with angularly related portions so that the direction of centrifugal force extending radially from the axis of rotation 71 of the regulator 66 will act substantially normal to the direction of movement of the respective parts of the valve assembly. In this manner the thrust of centrifugal force will not have any detrimental effect upon lineal movement of the various valve components.

The various functions of the valve assembly of the present invention, when used in conjunction with a variable pitch propeller, will be readily apparent from a reference to the aforementioned copending application. However, for the purposes of the instant disclosure, it is sufficient to say that the groove 23 is connected by suitable passage means, within the valve body 11 to annular groove 27 and the servo chamber 28. Ports 19 and annular groove 25 are connected by a passage 72, which connects by means with an annular groove 73 and a servo chamber 74 associated with the selector valve assembly 65. Annular grooves 22 and 26 are connected to a source of fluid under pressure.

The operation of the valve assembly is as follows: When the solenoid associated with plunger 44 is energized by manipulation of a switch, not shown, the plunger 44 will move to the right, as viewed in Fig. 2, whereupon the pin 42 will also move to the right, as viewed in this figure. As heretofore stated, movement of the plunger is determined by the longitudinal extent of the air gap associated with the magnet assembly, and this movement need only be sufficient so that the pin 42 will effect movement of the spool valve 30 to the right, whereby ports 16 and 18 will be interconnected. When ports 16 and 18 are interconnected, pressure fluid will flow through passage means, not shown, to annular groove 27 and the servo chamber 28 whereupon the spool valve 31 will be moved into engagement with the end of spring guide 35, thereby interconnecting ports 17 and 19. Interconnection of ports 17 and 19 associated with spool valve 31 will effect flow of pressure fluid to annular groove 73 and servo chamber 74 whereupon the plunger of the selector valve assembly 65 will be moved upwardly, as viewed in Fig. 3.

Upon deenergization of the solenoid associated with plunger 44, the spring 32 will move the spool valve 30 to the position it is shown in the drawing, thereby interrupting the connection between ports 16 and 18 associated therewith. Accordingly, fluid under pressure will no longer be supplied to the servo chamber 28 associated with the spool valve 31 and the spring 35 will urge the spool valve 31 to the position it is shown in Fig. 2, by forcing the fluid from chamber 28 through passage means, not shown, to the annular groove 23, which is connected by ports 18 and ports 20 to the drain passage 29. Upon energization of solenoid winding 48 associated with plunger 45, the spool valve 31 will be moved to the left to interconnect ports 17 and 19 by means of slidable pin 43. In this instant fluid under pressure will again be supplied to the servo chamber 74 associated with the selector valve assembly 65 in a manner heretofore described.

In some instances the electrical circuitry for energizing the solenoid windings of the valve assembly may be such that the solenoids cooperable with both plungers 44 and 45 will be energized simultaneously. In this event, the spool valve 31 will be moved to the left, as viewed in Fig. 2, to interconnect ports 17 and 19 by movement of the pin 43 rather than by the application of pressure fluid to the servo chamber 28. However, the valve assembly is so designed that should a malfunction occur in the electrical circuitry to solenoid winding 48, both spool valves 30 and 31 will be moved to interconnect their respective supply and control ports whenever the solenoid associated with plunger 44 is energized. When the valve assembly is employed in this capacity, the servo actuation of the spool valve 31 is provided as a safety feature.

It is apparent from the foregoing that the present invention provides a valve assembly, the operation of which is not materially affected by the thrust of centrifugal force present in a rotating structure. By reason of the floating support for the armature assembly of the magnet, the valve assembly may be mounted in any position and the effect of gravity will not affect its operation.

While the embodiment of the present invention as herein disclosed, constitutes a preferred form, it is to be understood that other forms might be adopted.

What is claimed is as follows:

1. In a valve assembly, the combination including, a body having a bore therethrough, said body having inlet, outlet and drain port means therein communicating with said bore, a pair of spool valve elements disposed in said bore and mounted for movement relative to said body for selectively interconnecting the outlet port means with the inlet port means or the drain port means, resilient means normally urging said spool valve elements apart, means for individually moving each spool valve element toward the other to interconnect the outlet port means with the inlet port means, and means rendered operative upon movement of one of said spool valve elements toward the other for completing a flow path to an end surface of the other spool valve element to effect movement of said other spool valve element toward said one spool valve element.

2. In a valve assembly, the combination including, a body having a bore therethrough, said body having inlet, outlet and drain port means therein communicating with said bore, a pair of spool valve elements disposed in said bore and mounted for movement relative to said body for selectively interconnecting the outlet port means with the inlet port means or the drain port means, resilient means normally urging said spool valve elements apart, means for individually moving each spool valve element toward the other to interconnect the outlet port means with the inlet port means, means rendered operative upon movement of one of said spool valve elements toward the other for completing a flow path to an end surface of the other spool valve element to effect movement of said other spool valve element toward said one spool valve element, and stop means associated with each valve element and limiting the movements thereof.

3. In a valve assembly, the combination including, a body having a bore and a porting sleeve therein, said porting sleeve having spaced pairs of inlet ports, spaced pairs of outlet ports and spaced pair of drain ports, a pair of valve elements shiftable along the porting sleeve for selectively interconnecting said outlet ports with the inlet ports or the drain ports, resilient means normally urging said valve elements apart, means operatively associated with each valve element for effecting movement thereof toward the other valve element for interconnecting its respective outlet port with its respective inlet port, means rendered operative upon movement of one valve element towards the other valve elment for completing a flow path to an end surface of the other valve element to effect movement of said other valve element towards said one valve element, and stops limiting the amount of movement of said valve elements within said porting sleeve.

4. In a valve assembly, the combination including, a body having a bore and a porting sleeve therein, said porting sleeve having spaced pairs of inlet ports, spaced pairs of outlet ports and spaced pair of drain ports, a pair of valve elements shiftable along the porting sleeve for selectively interconnecting the outlet ports with the inlet ports or the drain ports, resilient means normally urging said valve elements apart, means operatively associated with each valve element for effecting movement thereof toward the other valve element for interconnecting its respective outlet port with its respective inlet port, stops limiting the amount of movement of said valve elements within said porting sleeve, and means rendered operative upon movement of one of said valve elements toward the other for completing a flow path to an end surface of the other valve element to effect movement of said other valve element toward said one valve element.

5. In a valve assembly, the combination including, a body having a bore therethrough, said body having inlet, outlet and drain port means communicating with said bore, a pair of valve elements disposed within said bore, resilient means normally urging said valve elements apart, a plunger assembly associated with each valve element for effecting movement thereof toward the other valve element to interconnect the outlet port means with the inlet port means, means rendered operative upon movement of one valve element towards the other valve element for completing a flow path to an end surface of the other valve element to effect movement of said other valve element towards said one valve element, and stop means defining the limits of movement of said valve elements.

6. In a valve assembly, the combination including, a body having a bore therethrough, said body having inlet, outlet and drain port means communicating with said bore, a pair of valve elements disposed within said bore, resilient means normally urging said valve elements apart, a plunger assembly associated with each valve element for effecting movement thereof toward the other valve element to interconnect the outlet port means with the inlet port means, means rendered operative upon movement of one valve element towards the other valve element for completing a flow path to an end surface of the other valve element to effect movement of said other valve element towards said one valve element, stop means defining the limits of movement of said valve elements, and electrically actuated means for effecting movement of each plunger assembly.

7. A valve assembly including, a porting sleeve, said porting sleeve having spaced pairs of inlet ports, spaced pairs of outlet ports and spaced pairs of drain ports, a pair of valve elements spacedly supported within said sleeve, a pair of plunger assemblies for individually effecting movement of said valve elements along said sleeve to interconnect its respective outlet port with its respective inlet port, and means instantaneously operative upon movement of one of said valve elements for effecting movement of the other valve element independent of its plunger assembly.

8. A valve assembly including, a porting sleeve, said porting sleeve having spaced pairs of inlet ports, spaced pairs of outlet ports and spaced pairs of drain ports, a pair of valve elements spacedly supported within said sleeve, a pair of plunger assemblies for individually effecting movement of said valve elements along said sleeve to interconnect its respective outlet port with its respective inlet port, means instantaneously operative upon movement of one of said valve elements for effecting movement of the other valve element independent of its plunger assembly, stops defining the limits of movements of said valve elements, and a pair of magnet assemblies for effecting movement of said plunger assemblies.

9. In combination, a rotating structure, a valve assembly adapted for operation in said rotating structure including, a valve housing having angularly related portions with inlet, outlet and drain port means, said valve housing being so mounted in said rotating structure that centrifugal force acts at substantially right angles to the centers of communicating openings in each of said angularly related portions, a spool valve assembly movably supported within one of said openings for selectively interconnecting the outlet port means with the inlet port means or the drain port means, and means operatively engaging said spool valve assembly and disposed in the communicating openings for effecting movement thereof.

10. In combination, a rotating structure, a valve assembly adapted for operation in said rotating structure including, a valve housing having angularly related portions, said valve housing being so mounted in said rotating structure that centrifugal force acts at substantially right angles to the centers of communicating openings in each of said angularly related portions, a porting sleeve disposed within one of said openings, said porting sleeve having inlet, outlet and drain port means, a spool valve assembly movably supported within one of said openings for selectively interconnecting the outlet port means with the inlet port means or the drain port means, and means operatively engaging said spool valve assembly and disposed in the communicating openings for effecting movement thereof.

11. In combination, a rotating structure, a valve assembly adapted for operation in said rotating structure including, a valve housing having angularly related portions with inlet, outlet and drain port means, said valve housing being so mounted in said rotating structure that centrifugal force acts at substantially right angles to the centers of communicating openings in each of said angularly related portions, a spool valve assembly movably supported within one of said openings for selectively interconnecting the outlet port means with the inlet port means or the drain port means, and means operatively engaging said spool valve assembly and disposed in the communicating openings for effecting movement thereof, said spool valve assembly comprising a pair of spacedly supported valve elements, and servo actuated means rendered operative upon movement of one of said spool valves for effecting movement of the other of said spool valves independent of said first recited means.

References Cited in the file of this patent

UNITED STATES PATENTS

| | | |
|---|---|---|
| 1,307,207 | Mitchell | June 17, 1919 |
| 2,451,810 | Cohen | Oct. 19, 1948 |
| 2,566,051 | Avery | Aug. 21, 1951 |
| 2,575,850 | Swickard | Nov. 20, 1951 |
| 2,582,088 | Walthers | Jan. 8, 1952 |
| 2,619,121 | Renick | Nov. 25, 1952 |